US010427807B1

(12) United States Patent
Stackpoole et al.

(10) Patent No.: US 10,427,807 B1
(45) Date of Patent: Oct. 1, 2019

(54) METHOD OF FABRICATING A FLEXIBLE, LOW-DENSITY THERMAL PROTECTION MATERIAL

(71) Applicant: The USA as Represented by the National Aeronautics and Space Administration (NASA), Washington, DC (US)

(72) Inventors: Margaret M. Stackpoole, Santa Clara, CA (US); Ehson M. Ghandehari, Livermore, CA (US); Jeremy J. Thornton, Gardena, CA (US); Melmoth Alan Covington, San Jose, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 257 days.

(21) Appl. No.: 15/448,424

(22) Filed: Mar. 2, 2017

Related U.S. Application Data

(62) Division of application No. 13/658,749, filed on Oct. 23, 2012, now Pat. No. 9,592,923.

(60) Provisional application No. 61/550,876, filed on Oct. 24, 2011.

(51) Int. Cl.
*B64G 1/00* (2006.01)
*B64G 1/58* (2006.01)

(52) U.S. Cl.
CPC ...................................... *B64G 1/58* (2013.01)

(58) Field of Classification Search
CPC ......................................................... B64G 1/58
See application file for complete search history.

(56) References Cited

U.S. PATENT DOCUMENTS

| | | | | |
|---|---|---|---|---|
| 5,536,562 A | * | 7/1996 | Tran .......................... | B64G 1/58 244/121 |
| 7,919,167 B1 | * | 4/2011 | Rawal ....................... | B64G 1/58 427/181 |
| 7,931,962 B1 | * | 4/2011 | Willcockson ............ | B64G 1/58 244/159.1 |

* cited by examiner

*Primary Examiner* — Robert A Vetere
(74) *Attorney, Agent, or Firm* — Meredith K. Blasingame; Rhys W. Cheung; Robert M. Padilla

(57) ABSTRACT

A method for preparing a flexible low-density thermal protection material, the method comprising providing a flexible substrate and a pyrolizable material impregnated therein. The thermal protection material remains flexible after impregnation and continues to remain flexible when the pyrolizable material is fully pyrolized.

17 Claims, 7 Drawing Sheets

METHOD OF FABRICATING A FLEXIBLE, LOW-DENSITY THERMAL PROTECTION MATERIAL

RELATED APPLICATIONS

The application is a divisional of U.S. patent application Ser. No. 13/658,749, filed Oct. 23, 2012. U.S. patent application Ser. No. 13/658,749 claims priority from U.S. Provisional Patent Application Ser. No. 61/550,876, filed Oct. 24, 2011. The contents of U.S. patent application Ser. No. 13/658,749 and U.S. Provisional Application No. 61/550,876 are hereby incorporated in their entirety.

ORIGIN OF THE INVENTION

The invention described herein was made in the performance of work under NASA contracts and is subject to the provisions of Public Law 96-517 (35 U.S.C. § 202), pursuant to which the contractor elected not to retain title.

FIELD OF THE INVENTION

One or more embodiments of the present invention relate to flexible composite materials that retain flexibility after exposure to temperatures sufficient to char at least one component.

BACKGROUND

A Thermal Protection System ("TPS") can employ a wide variety of protection strategies. Systems may be one-time-use or re-useable. They may be monolithic (one piece) or tiled. They may employ a variety of insulation and/or cooling strategies. TPS for atmospheric entry vehicles provides one of the most challenging set of constraints. The thermal loads can be extreme, total volume and mass must be kept to a minimum, and reliability must be high. These constraints have resulted in many innovations in TPS systems over the last 50 years that have been successfully deployed in both atmospheric entry applications and other applications such as fire protection, oven and kiln insulation, and so on.

For a one-time-use TPS, one of the more effective mechanisms for rejecting heat at the surface of the TPS material is by ablation. Ablation of TPS material serves to lift the hot shock layer gas away from the surface thereby creating a cooler boundary layer. Ablation causes some of the TPS material to char and sublime through the process of pyrolysis. The gas produced by pyrolysis blocks convective heat flux. Ablation can also provide blockage against radiative heat flux by introducing carbon particulates into the boundary layer to make it optically opaque.

In atmospheric entry applications, ablation may actually provide the single most important mechanism for thermal protection. However, thermal insulation against conductive heat flow from an outer surface to an inner surface is still critical, and any effective TPS system also needs to have high thermal resistance. Preferably, it should also have low mass, which typically means that designs which minimize thickness and material density are preferred. The thickness of the material has frequently imposed a large weight penalty for a spacecraft flying a long heat pulse trajectory. For these types of missions, the prior art reusable and ablative TPS used thick refractory-fiber "tile" insulation to limit heat conduction to the structure. The TPS weight often occupied a large fraction of the total reentry vehicle weight, limiting the weight of usable scientific payload. The thickness also increased material cost. Due to a low strain-to-failure, the TPS also required a rigid support structure (if direct-bonded) or a strain isolating pad. Since tiles were both rigid and typically of significantly different thermal expansion coefficients than the underlying structure, this also means that tiles must be spaced with suitable gap fillers between them. Failure of the gap fillers can be just as serious as tile failure.

More specifically, historical ablative TPS systems ("ablators") have been built as composite materials comprising ceramic or carbon fibers and an organic polymeric matrix. High density ablators having a density of about 1.1-1.9 $g/cm^3$ or higher, were developed with various polymers such as epoxy, phenolic, and silicone reinforced with asbestos fibers, graphite cloth, silica cloth, etc. by known processes. Low density ablators have also been developed, for example, comprising polymers, silica or phenolic microballoons to reduce density, and ceramic fibers and/or a honeycomb structure for reinforcement. The principal method of thermal protection of these ablators was provided by ablation (i.e., pyrolysis or thermal decomposition) of the polymer.

It is important to understand the chemical processes that go on during a typical use scenario for reinforced polymer ablators. As already discussed, the polymer is a sacrificial material which is substantially pyrolized to provide cooling gases in the boundary layer. This process typically takes place in the presence of very little available oxygen, and the gas flow is outward from the ablator preventing any significant replenishment of oxygen from the surrounding atmosphere. Thus, the pyrolysis of the polymeric matrix is primarily a thermal decomposition process (which occurs because operating temperatures exceed polymer thermal stability limits), but not a burning or oxidation process. The polymer bonds are broken, releasing pyrolysis products such as oxygen, hydrogen and/or low molecular weight organic materials and leaving behind most of the carbon (at least for polymer resins comprising only carbon, hydrogen, and oxygen). The residual carbon is referred to as a "char." Similarly, if some form of carbon filler (fibers, cloth, honeycomb, etc.) is used, that carbon survives the ablation process substantially intact. If fact, carbon turns out to be more suitable as a filler and/or matrix at higher operating temperatures than most ceramic materials, because it does not melt.

During the early years of Space Shuttle heat shield development, "passive transpiration" systems were proposed. The systems included a low density, high temperature ceramic material such as silica, carbon, potassium titanate, or graphite, impregnated with "coolants" such as polyethylene, or an epoxy, acrylic, or phenolic. Use of a passive transpiration system increases the heat rate capability of the ceramic substrate by addition of an organic coolant, which functions as a transpirant. However, the high density of the final product increased weight of the system, and because the organic coolant filled the void volume of the ceramic fiber assembly, the organic coolant acts as an additional heat conduction path, increasing the overall thermal conductivity. Conventional ablators are generally manufactured in a process wherein the polymers and other components, such as the microballoons and the reinforcing fibers, are uniformly mixed and cured. These products have a uniform density, which is also a disadvantage in minimizing weight.

More recently, low-density TPS systems have been developed, typically comprising a low-density fiber structure such as a felt made from ceramic or carbon fibers, that is "impregnated" with a polymer resin. The fiber structure was typically made with a high void fraction (more than 90%), and only sufficient resin was used to surround the fibers with resin (i.e., an amount of resin approximately equal in weight to the fiber weight). The amount of resin could also be kept low by impregnating it as a high-surface-area nanoporous material, where the nanoporous material substantially fills the voids in the fiber structure. Microscopic analysis indicated that the resin does not wet the carbon fiber, but it is nevertheless well-distributed through the fiber matrix. The finished material thus also had a high void fraction, and TPS material densities of substantially less than 1 g/cm$^3$ could be provided which exhibited correspondingly low thermal conductivities compared to a fully filled high density material.

An important example of such a low-density ablator is the phenolic-impregnated carbon ablator ("PICA") material developed about 15 years ago and successfully used in the Stardust mission which returned sample material from Comet Wild to Earth for analysis. PICA was also one of the leading candidate materials evaluated to make the heat shield for the next generation general-purpose launch vehicle (Orion mission). PICA was ultimately not selected, in part because the problem of finding a good gap-filling material for the space between PICA tiles was not fully solved. However PICA was chosen for the Mars Science Lab mission (MSL), due to launch in November 2011 with a tiled PICA TPS.

PICA comprises a FIBERFORM™ carbon fiber backbone impregnated with a highly cross-linked phenolic polymer matrix. FIBERFORM is an anisotropic rigid material made from randomly oriented carbon fibers "glued" together with a charred resin. (Carbon fibers are themselves made by charring polymer fibers.) PICA has low density ($\rho$=0.23-0.27 g/cm$^3$) and superior ablation characteristics. However, because of the rigid FIBERFORM carbon fiber substrate and highly cross linked phenolic polymer matrix used, the present formulation of PICA is a relatively weak and brittle material that has structural limitations due to its rigid nature and low strain to failure. Standard PICA must be tiled and supported by additional structural backing for applications over 1 m. PICA has poor mechanical characteristics (large variability in all mechanical properties (strength, modulus, etc.) due to its brittle behavior, and it has low "toughness" (e.g., for micrometeorite impact and general handling).

Procedures for fabrication of standard PICA material are disclosed in U.S. Pat. Nos. 5,536,562, 5,672,389 and 6,955,853, issued to Tran et al. and incorporated herein by reference.

U.S. Pat. No. 7,931,962, issued to Willcockson et al., provides a partial improvement over standard PICA by disclosing an ablator made from a flexible fabric impregnated with a flexible silicone or fluoropolymer ablator. This ablator is flexible only before use, and this enables deployable TPS designs. The use of silicone or fluoropolymer is limiting, however, in that thermal loading is limited to below 200 W/cm$^2$. Further, the continuous structure of the impregnated polymer ablator means that the material becomes rigid and brittle after pyrolysis, which limits TPS designs to those that would be unaffected by such structural change during use. For example, silicone pyrolizes to a silica material, which is glassy and very rigid. For atmospheric entry applications, such loss of flexibility could cause catastrophic failure of a TPS system during the later stages of atmospheric entry.

What is needed is a family of new TPS materials that are flexible and conformal and have
- increased toughness (less brittleness),
- large strain to failure,
- improved ultimate tensile strength ("UTS"),
- low density, and
- improved mechanical and thermal responses.

Further there is a need for materials that remain flexible when pyrolized and are capable of being applied in large sections in few pieces to minimize the need for gap fillers.

SUMMARY OF THE INVENTION

A low-density article comprising a flexible substrate and a pyrolizable material impregnated therein, methods of preparing and devices using the article are disclosed. The low-density article remains flexible after impregnation and continues to remain flexible when the pyrolizable constituent is fully pyrolized. Preferably, the pyrolizable material does not flow at temperatures below the pyrolysis temperature, and has a pyrolysis temperature above 350 C. The pyrolizable material can comprise between 20% and 80% of the mass of the article, preferably between 40% and 60% of the mass of the article. The density of the article can be between 0.15 and 0.35 g/cm$^3$. The flexible substrate can be a felt, and can comprise carbon fibers. The pyrolizable material can comprise a thermoset resin such as phenolic, polyimide, polybenzobisoxazole, polybenzimidazole, polyaramid or a mixture thereof. The low-density article can further comprise a seal coat.

The pyrolizable material can be embedded as particles having a median diameter of 2-6 μm, and can be either uniformly distributed or distributed with a density gradient through the thickness of the low-density article. Alternatively, the pyrolizable material can be in the form of fibers mixed with the substrate fibers forming the flexible substrate (e.g., felt).

One method of forming the low-density article comprises forming a slurry of particles of pyrolizable material in a carrier liquid, forcing the slurry into the flexible substrate, and heating the slurry-filled flexible substrate to evaporate the carrier liquid. The viscosity of said slurry can be low enough that the final distribution of particles is uniform through the thickness of the low-density article or high enough that the final distribution of particles is graded through the thickness of the low-density carbon article. In certain embodiments, the forcing comprises using a pressure gradient.

Another method of forming the low-density article comprises mixing fibers of carbon with fibers of the pyrolizable material in a carrier liquid and forming a flexible substrate from the mixed fibers.

Yet another method of forming the low-density article comprises forcing liquid thermoset resin into the flexible substrate using a pressure gradient, curing the thermoset resin by application of heat, and mechanically breaking the monolithic structure of the cured thermoset resin within the flexible substrate.

A thermal protection system can be made comprising an ablator made from a continuous sheet of the low-density article. The thermal protection system can be mounted on an atmospheric entry vehicle, mounted on a rigid substrate, or stowed prior to atmospheric entry and deployed by inflation shortly before atmospheric entry or mechanically deployed shortly before atmospheric entry.

DETAILED DESCRIPTION

Figure 1:
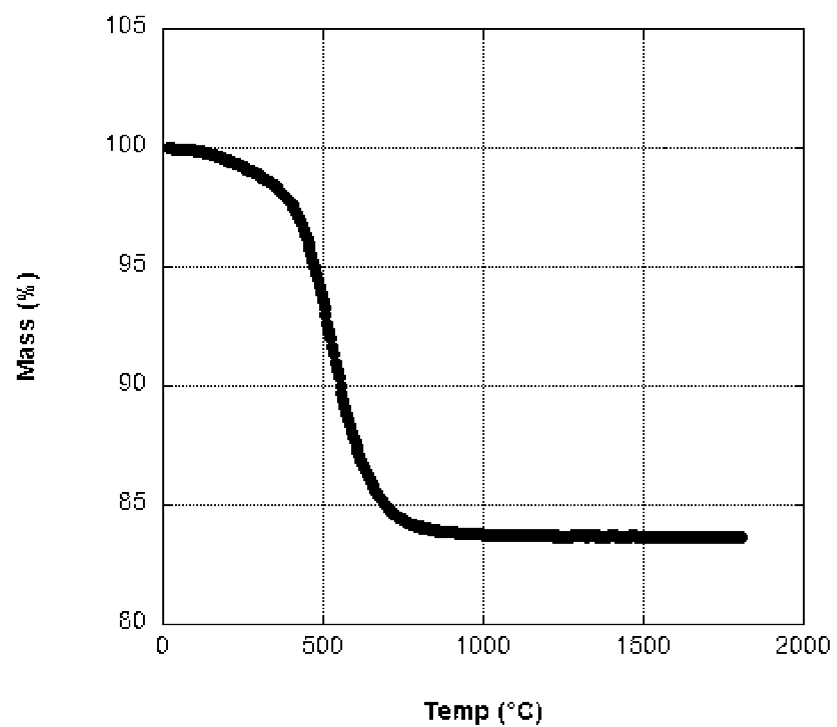
FIG. 1 shows TGA data for a sample of flexible PICA.

Before the present invention is described in detail, it is to be understood that unless otherwise indicated this invention is not limited to specific polymers or reinforcing materials. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a polymer" includes two or more polymers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the term "substantially unchanged" is used, changes of up to 2% can be allowed.

Definitions

As used herein, the term "Thermal Protection System" or "TPS" refers to a system which prevents overheating on one side of a boundary from a heat load on the other side. Depending on the application, the goal may be to minimize heat loss from an intentionally heated region such as a furnace or kiln, or to protect heat sensitive components from excessive heat exposure, as for example in atmospheric entry vehicles, rocket nozzles, and the like.

As used herein, the term "ablation" refers to the process by which material is pyrolyzed to provide thermal protection. At least two mechanisms contribute: the heat of pyrolysis absorbs significant energy, and the gases given off by pyrolysis contribute to the formation of a protective gas boundary layer.

As used herein, the term "ablator" refers to a material in a TPS device which uses ablation for part of the thermal protection mechanism.

As used herein, the term "pyrolysis" (verb form: to pyrolize, adjective form: pyrolizable) refers to the thermochemical decomposition of organic material at elevated temperatures in the absence of oxygen.

As used herein, the term "pyrolysis temperature" refers to the temperature at which 50% of the mass that can be removed by pyrolysis has been lost under conditions of very slow heating. Typically, the pyrolysis temperature can be measured with high surface area samples in a thermogravimetric analysis (TGA) device. For polymers, TGA data typically shows mass loss over a range of temperatures, and the pyrolysis temperature is mass midpoint of that range.

As used herein, the term "char" as a verb is a synonym of "pyrolize," and as a noun refers to the residual material left after pyrolysis, typically comprising predominantly carbon.

As used herein, the term "flexible" refers to a material that can be bent to a radius of curvature less than five times the material thickness and returned to original condition without damaging the material. For example one-inch thick flexible PICA materials can be bent over a three-inch radius cylinder and fully recover without apparent material damage or permanent deformation. Some microscopic change can be acceptable, but key mechanical properties such as the strain to failure remain substantially unchanged.

As used herein, the term "Phenolic-Impregnated Carbon Ablator" or "PICA" refers to an article made from a composite material comprising a low-density carbon fiber preform impregnated with phenolic resin. Prior art or "standard" PICA materials are made with a rigid carbon fiber preform impregnated with liquid phenolic resin which is then thermally set. The resin is typically added at approximately equal weight to the carbon preform, although greater or lesser loading is possible.

As used herein, the term "flexible PICA" refers to embodiments of the present invention made from flexible carbon felts and loaded with phenolic fibers or particles. The resulting materials have material composition and density comparable to standard PICA, but have very different mechanical and thermal properties. Flexible PICA is used as an exemplary embodiment herein, although the present invention is not limited to carbon felts or to phenolic resins.

As used herein, the term "felt" refers to a non-woven fabric made directly from short fibers which are randomly oriented and sufficiently entangled to provide structural integrity. A "needled" felt has improved structural integrity provided by increased entanglement generated by repeated mixing across the thickness direction using barbed needles from one or both sides to help interlock the fibers. Felts can be made in a wide range of thicknesses.

As used herein, the term "substrate" refers to a sheet material that can be further modified to create a useful article. The substrates used herein are generally "porous" in that they have significant void fraction, initially filled with air, and an open structure which allows the pores to be filled with other materials such as liquids and allows gases to pass freely in and out.

As used herein, the term "thermoset resin" refers to a polymer which crosslinks ("cures") under the influence of heat (i.e., exposure to a temperature higher than normal service temperature for some period of time). Typically, the process is irreversible. Once cured, thermoset resins are typically hard, brittle materials that do not exhibit much elasticity or extensibility. "Liquid" thermoset resins are the precursor materials before they have been set. In liquid form, they can be poured into molds, impregnated into porous materials, mixed with solvents, pigments and fillers, etc.

As used herein, the term "impregnation" refers to a process wherein a second material is placed into the voids of a porous substrate. The resulting composite article contains substrate material and second material that are spatially intermingled. Depending on the choice of materials and impregnation methods used, a wide range of composite structures and properties are possible. In the low-density resin-impregnated articles described herein, the void space in the porous substrate is only slightly filled, and the finished article remains low density.

As used herein, the term "Ultimate Tensile Strength" or "UTS" is the stress (force per unit area) at which a material fails (i.e., breaks, tears, ruptures) abruptly.

As used herein, the term "strain to failure" refers to the amount of strain a material can withstand before it fails, strain to failure is determined during stress-strain analysis and is expressed as a percentage strain at material failure.

As used herein, the term "toughness" refers to the ability of a material to absorb energy and plastically deform without fracturing. It is measured by the amount of energy per volume that a material can absorb before rupturing and can represent the resistance to fracture of a material when stressed. Toughness can be quantified as the area under a stress-strain curve extended to failure.

The present invention provides significant improvements on the prior art PICA TPS materials by modifying the manufacturing process to produce a material which is flexible, extensible, and tough, and which substantially retains its mechanical properties, including flexibility after charring. A flexible preform is provided (made from carbon fibers in one embodiment), and novel impregnation methods are used to so that the mechanical properties of the preform after impregnation with a pyrolizable material and again after charring are retained. Exemplary embodiments of the resulting class of materials made from carbon and phenolic are referred to herein as "flexible PICA."

Experimental examples are presented below using phenolic resins for the pyrolizable material, although other polymers are also known to make good ablators and can be suitable to use in embodiments of the present invention. Good ablators have high heat resistance, high heat of pyrolysis, and high char yield. Suitable examples of polymers include phenolic, polyimide, polybenzobisoxazole ("PBO" or ZYLON®), and polybenzimidazole ("PBI" or CELAZOLE®), polyaramids such as NOMEX® and bismaleimide (BMI), and BMI-phenolic blends. Non-polymers can also be used as ablators. However, for the flexible ablators disclosed herein, it is also preferable that the pyrolizable materials remain mechanically stable and not flow or stick rigidly together before, during or after pyrolysis so that the ablator remains flexible after pyrolysis. This important property generally precludes the use of most thermoplastic materials. Further, for applications involving exposure to high heat loads, preferred embodiments of the instant invention generally use pyrolizable materials that pyrolize at higher temperatures, for example, over 350 C. FIG. 1 shows TGA data for a flexible PICA sample with phenolic pyrolizable material. The pyrolysis temperature is seen to be above 500 C.

The standard PICA material is made using a rigid FIBERFORM material comprising a rigid low-density billet of randomly oriented carbon fibers. According to one or more embodiments of the present invention, this rigid preform is replaced with a flexible fabric material, for example, a needled felt of carbon fibers such as those manufactured by Fiber Materials, Inc., Morgan AM&T, and Americarb. Typical commercial products are >95% carbon made from RAYON® fibers. Such carbon felts have a room temperature density of about 0.08-0.15 g/cm$^3$, do not melt, and have a sublimation temperature of 3600 C. They are highly flexible and widely used in vacuum furnace applications. Stock products are available from each manufacturer in thicknesses of up to one inch and rolls up to 48 inches wide. Thicker felts are possible, but may be custom products.

While carbon has been found to provide many desirable characteristics for TPS applications, the present invention is not limited to carbon. Flexible fabrics made from other high temperature fibers such as ceramics and glasses can also be suitable. Unlike carbon, however, under conditions of very high temperature, most ceramics and glasses soften and melt, and an ablator made using ceramic or glass fiber preforms would not retain its flexibility. Such ablators would be suitable only in applications that either do not require flexibility after use or for which maximum temperatures do not exceed the temperature at which the preform fibers soften sufficiently to stick together.

While commercial carbon fiber felts are suitable flexible materials for use in embodiments of the present invention, the invention is not limited to preforms made from felts or to preforms made from pure carbon. Any convenient fabric structure can be used including woven, knitted, or other structured fabric in addition to felts. It is also possible to use fabric materials comprising carbon fibers mixed with polymer fibers as in Method 2 described below.

Standard PICA materials are impregnated with thermoset resins such as phenolics which are stiff and brittle. Therefore, if these materials are used to impregnate a flexible felt, the resulting composite material loses its flexibility and becomes rigid. Three new classes of methods were developed by the present inventors to overcome this limitation. All methods are designed to break the rigid structure and connectivity of the thermoset resin. As will be shown, the resulting composite materials are flexible, have large strain to failure, and have significantly lower thermal conductivity than standard PICA, and these characteristics persist after charring.

Method 1

According to one or more embodiments of the present invention, a slurry or colloidal suspension of particles of a thermoset resin such as phenolic or polyimide is prepared. The polymer particle size is optimized for infiltration into the carbon fiber preform. Typically, a median particle size of less than 4 μm was found to be suitable for impregnation into all tested felts.

Any suitable carrier liquid can be used; the resin is fully cured and insoluble in the carrier liquid. Typical example carrier liquids are common alcohols such as isopropyl or ethyl alcohol.

The impregnation (infiltration) can be accomplished by any common process. As an exemplary embodiment of impregnation, the liquid slurry is forced into the carbon fiber preform using a pressure gradient (e.g., a vacuum assist or gravity). The differential pressure across the preform, temperature, time, and the viscosity of the slurry can be adjusted to control the impregnation process. It is possible to produce a uniform impregnation using a low viscosity slurry. Exemplary processes with a slurry viscosity of less than 6 cP produced uniform ablators with polymer density constant through the material. After solvent evaporation, the finished composite material had a density of less than about 0.27 g/cm$^3$. Graded densities were conveniently produced using viscosities of 10-100 cP. For both uniform and graded-density ablators, the impregnation process is completed by evaporating the solvent. The final result as evidenced by microscopic analysis shows a distribution of polymer resin similar to standard PICA, although the resin is present in particulate clumps that are likely more loosely bound to the carbon fiber structure than for standard PICA. Further details are provided in Example 3.

Method 2

According to one or more embodiments of the present invention, a flexible fabric is made from a mixture of approximately equal parts carbon fibers and fibers made from a thermoset resin such as phenolic. As with Method 1, the phenolic is cured prior to incorporation into the fabric. The flexible fabric can be of any fabric type such as woven, knitted, or felt. The fibers can first be assembled into threads or yarns for subsequent weaving or knitting. Preferably, the fabric is a felt, especially a needled felt. Threads or yarns can also be used for stitching a fabric to a supporting member.

Methods for making and performance data for felts made by Method 2 are given in Example 4. While the process has not yet been fully optimized, sample needled felts with 60% (by volume) carbon fibers of 25 μm length mixed with 40% KYNOL fibers of 10 μm length had zero areal shrinkage on charring and exhibited about 18% net mass loss (comparable to standard PICA of the same mass ratio).

Mechanical testing of the KYNOL/carbon felts was encouraging. Strain to failure tests showed failure at 15-20% strain (compared to 10-15% for the felt samples made by Method 1). Similar necking behavior was observed. Thicker felts and increased needle punching (preferably from both sides) improved integrity and reduced data scatter.

Room temperature thermal conductivity was comparable to felt samples made by Method 1.

Method 3

According to one or more embodiments of the present invention, a carbon felt of the same type used in Method 1 is impregnated with uncured resin such as liquid phenolic which is then thermally cured according to standard methods. The samples are then treated mechanically, for example, by repeatedly passing samples through a roll mill to break the monolithic connected phenolic structure to achieve the desired conformability or flexibility.

While Method 3 has been tested and shown to provide flexibility that can be sufficient for real applications, samples made to date are generally less flexible than those produced by Methods 1 and 2.

Seal Coat

A seal coating can optionally be added to the outside of a flexible PICA material. Examples of a seal coating material include but are not limited to silicones, waxes, and tacifiers (generally rubber-based materials used in the composite industry to hold dry laminates together). The seal coat mass typically adds less than 5% mass to the final material. However, in many applications, it is anticipated that no seal coating should be required at all. Method 2 generally does not need a seal coat, as all materials are well bonded to the felt. Surface protection prior to launch can be provided by removable covers and gas curtains; after launch no protection may be required. A seal coat can be especially beneficial when using Method 1 to trap any surface particles and protect the material from contact damage during handling.

Performance Characteristics

Embodiments of the invention described herein provide superior strain to failure and lower thermal conductivity for a given material density and composition than standard PICA of equivalent density and composition. Samples were tested to evaluate their mechanical performance as described in Example 5. Flexible PICA failed gracefully, showing necking behavior traditionally associated with very ductile materials, exhibiting 8-12% strain before onset of necking, and failing at 10-20% strain. Flexible PICA char also exhibited about 10% strain before onset of necking. In contrast, standard PICA failed below 0.5% strain, and standard PICA char failed at about 0.25% strain. The Ultimate Tensile Strength (UTS) depended primarily on the density of the felt substrate. As shown in Example 5, the low-density Morgan felt showed a UTS of about 35 psi, the low and mid density FMI felts showed a UTS of about 50 psi, and the high-density FMI felt showed a UTS of about 100 psi. The UTS can therefore be selected by selecting the appropriate felt density. Strain to failure of all samples exceeded 10% which is sufficient for a wide range of applications.

The high strain tolerance of Flexible PICA enables uses and deployment possibilities that would be impossible using standard PICA. For example, Flexible PICA can be applied in very large sections (compared to the small tiles used with standard PICA), substantially eliminating the need for a compatible gap filler material, reducing parts count, and simplifying installation. Other specific example applications are described in the Applications section below.

Although ultimate tensile strength can be important, the high strain to failure of Flexible PICA is generally a more critical benefit to TPS designs. The underlying substrate need not be nearly as stiff and massive as that necessary for rigid and brittle TPS materials, which are prone to failure cracks that can cause catastrophic system failure. Flexible PICA can expand or contract gracefully and is unlikely to crack.

Samples were also tested to evaluate their thermal performance as described in Example 6. The flexible PICA samples showed substantially lower thermal conductivity compared to standard PICA, exhibiting only approximately one third the thermal conductivity of the standard PICA samples. This lower thermal conductivity is likely a result of both the looser structure of the carbon preform (not connected into a rigid three-dimensional network as is the FIBERFORM material) and the particulate nature of the polymer. Flexible PICA char retains the thermal conductivity advantage as well.

While performance limits of Flexible PICA have yet to be determined, tests in an Arc-Jet facility indicate that Flexible PICA is usable in TPS applications at thermal loads exceeding 500 W/cm$^2$, 35 kPA. The charred samples retained qualitative flexibility comparable to that of the uncharred material.

Applications:

Many past TPS systems were tiled, because large area devices could not readily be built, and because differential thermal expansion between TPS materials and the underlying substrate could cause bonding failure. Large area monolithic (i.e., untiled) TPS devices become practical with a TPS made from flexible PICA. There is no need to accommodate differential thermal expansion between the TPS and any underlying substrate or support structure. Direct bonding of monolithic flexible PICA to a substrate using standard high-temperature adhesives such as RTV560 (silicone manufactured by Momentive Performance Materials) or HT424 (phenolic adhesive film manufactured by Cytec) is possible.

TPS structures that are larger in area than the launch vehicle cross-section can be contemplated with flexible PICA. A TPS device can be deployed prior to or during reentry. For example, Mars landing missions are contemplated requiring the delivery of a large payload to the Mars surface. One proposed TPS for such a mission is in the form of a "hypersonic inflatable aerodynamic decelerator" ("HIAD"), which is envisioned as an inflatable, large, blunt shape to provide aerodynamic drag during hypervelocity atmospheric flight.

TPS devices made from flexible PICA can be inherently strong enough to require much less mass for structural support. Rather than using inflation for deployment, mechanical means of deployment of large aeroshells comprising, for example, a woven fabric material, have been proposed to make foldable and stowable TPS designs. Flexible PICA can be attached to the fabric of such a structure to provide adequate thermal protection.

Flexible PICA TPS can be used on a rigid carrier of significantly less mass than that required for standard PICA. The carrier structure can be allowed to deflect significantly, and the flexible PICA TPS would not crack and cause TPS failure as would standard PICA. This benefit alone can significantly reduce vehicle mass and increase available payload mass.

EXAMPLES

The practice of the present invention will employ, unless otherwise indicated, conventional techniques of organic chemistry, polymer chemistry, material science, mechanical engineering and the like, which are within the skill of the art. Other aspects, advantages and modifications within the scope of the invention will be apparent to those skilled in the art to which the invention pertains. Such techniques are explained fully in the literature.

In the following examples, efforts have been made to ensure accuracy with respect to numbers used (e.g., amounts, temperature, etc.) but some experimental error and deviation should be accounted for. Unless indicated otherwise, temperature is in degrees Celsius and pressure is at or near atmospheric.

Example 1: Milling of Phenolic Resin Particles

Figure 2:
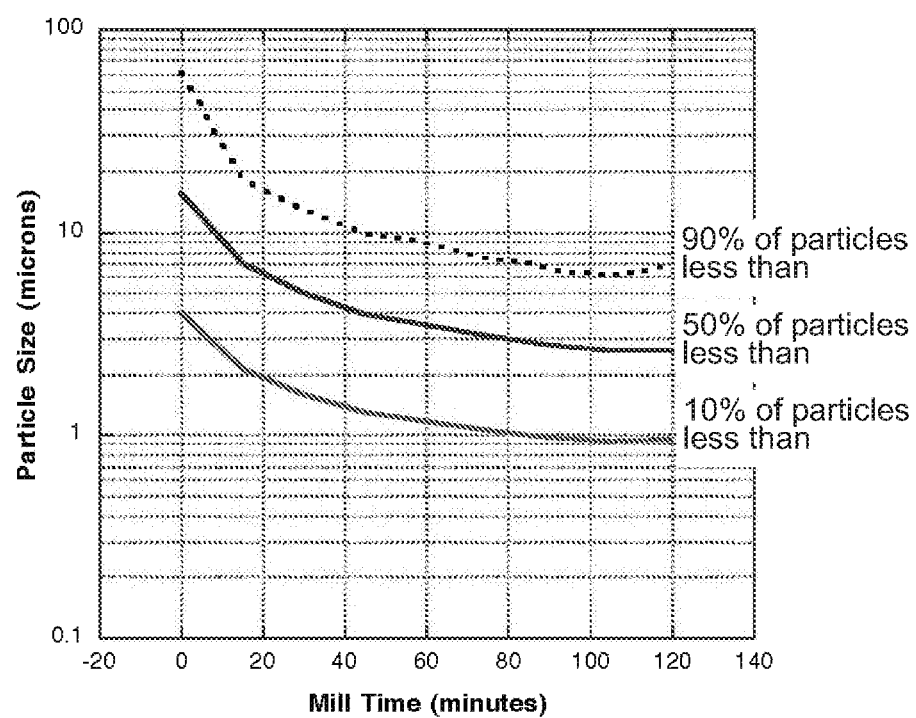
FIG. 2 shows the evolution of phenolic particle size with mill time.

Particles were prepared by milling cured phenolic. Liquid phenolic resin was cured and broken into small fragments before milling. Milling was completed using attrition mills (depending on the batch size needed, either model 01-HD Szegvari Attritor or 1-S attritor both made by Union Process). Ceramic (zirconia) ball mill media was used in both cases although other media including metal can also be used since phenolic is not hard. Milling times of less than 2 hr were sufficient to provide particles of an appropriate size distribution. FIG. 2 shows the evolution of particle size with mill time. For example, a median particle size of 4 μm required about 50 min.

Example 2: Preparation of Flexible PICA

Four versions of flexible PICA were made for the tests described in other examples and tables herein. Their descriptions are given in Table 1.

TABLE 1

| Sample | Description |
|---|---|
| PICA-flex 1 | FMI mid-density felt (~0.15 g/cm$^3$) infiltrated with phenolic particles with low char yield silicone seal coat |
| PICA-flex 2 | Morgan low-density felt (~0.08 g/cm$^3$) infiltrated with phenolic particles with low char yield silicone seal coat applied by spraying the sample after processing with an amount of silicone ~2% by mass of total sample |
| PICA-flex 3 | FMI mid-density felt (~0.15 g/cm$^3$) infiltrated with phenolic particles with a fire retardant seal coat ("Fire Block" made by Firefreeze Worldwide, Inc.; Fire Block goes through an endothermic reaction as it is exposed to high temperature) |

TABLE 1-continued

| Sample | Description |
|---|---|
| PICA-flex 4 | FMI mid-density felt (~0.15 g/cm$^3$) infiltrated with phenolic particles with a tacifier seal coat |

The FMI felts were 0.7-0.85 in thick; the Morgan felt was about one inch thick. For each sample, the phenolic particles were prepared according to the methods of Example 1, made into a low-viscosity (~4 cP) slurry in isopropyl alcohol, impregnated using vacuum assist, and dried as detailed in Example 3.

Example 3: Impregnation of Particle Slurries

Particle slurries were made comprising the phenolic particles of Example 1 in a carrier liquid of either ethanol or isopropyl alcohol. It is possible to produce a uniform impregnation by infiltrating the felt with a low viscosity slurry. Generally, slurry particle densities less than about 10% of the carrier liquid (by volume) produced slurries with viscosities below 10 cP that were suitable to produce uniform impregnation of particles into felts.

A vacuum assist (differential pressure 8-12 psi) was used to pull the slurry into carbon felt materials. Four sample carbon felts were tested having varying densities: "low" (0.126 g/cm$^3$), "mid" (0.149 g/cm$^3$), and "high" (0.185 g/cm$^3$) density felts from Fiber Materials, Inc. (FMI), and an even lower density felt (0.075 g/cm$^3$) from Morgan AM&T. Exemplary processes with a slurry viscosity of less than 6 cP produced uniform ablators with polymer density constant through the material. The impregnation process was completed by evaporating the carrier liquid.

Figure 3:
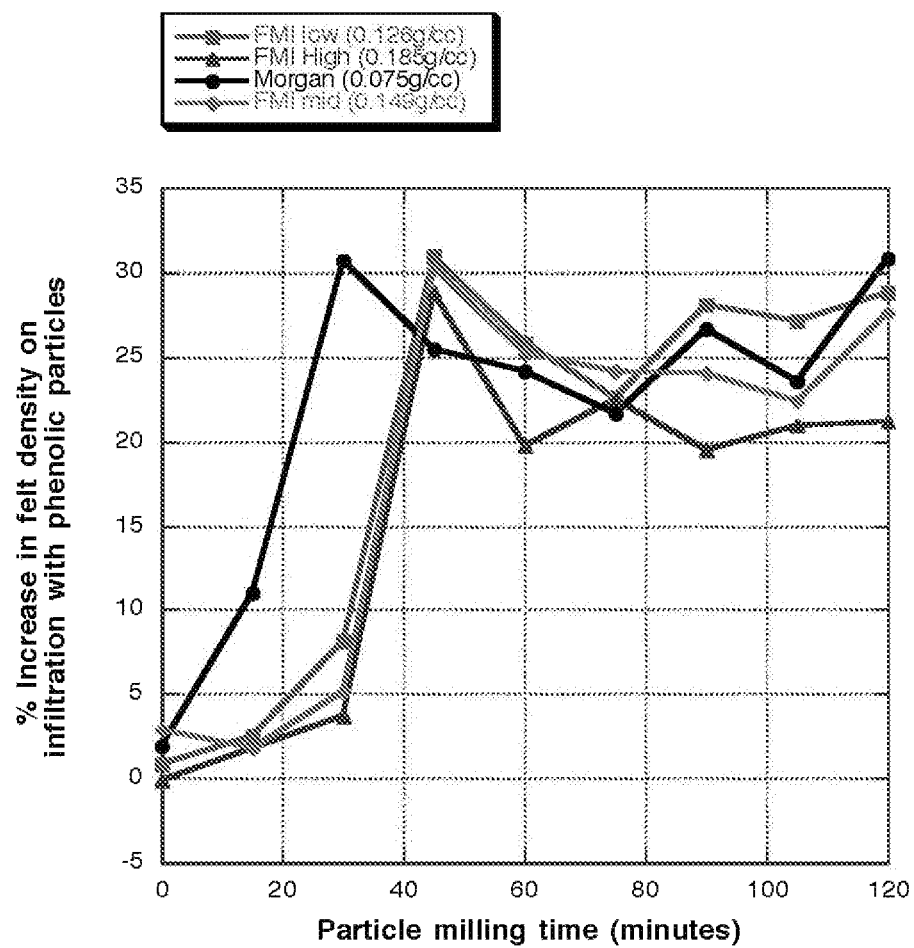
FIG. 3 shows the relative mass of phenolic particles impregnated into sample carbon felts as a function of mill time.

To determine the most suitable particle size, samples were infiltrated from a ~4 cP slurry using particles that had been milled for varying times. The results are shown in FIG. 3. Referring back to FIG. 2 to correlate mill time with particle size, it can be seen that particles with a median size of 4 μm or less provide good infiltration. Slightly larger particles (5 μm) can be used with the lowest density felt. The slurry particle densities (viscosities) used for the data of FIG. 3 generally produced a net particle mass loading of about 25% of the felt mass. The particle loading can be increased or decreased by modifying the slurry particle density. Increased particle impregnation can also be achieved by repeated infiltration, drying the samples between infiltrations.

To evaluate the effect of felt thickness, samples comprising a stack of four layers of 10 mm thickness each (density 0.107 g/cm$^3$) were infiltrated as a single piece and then measured for mass density of phenolic impregnation. The results showed a slight gradient and successful impregnation of the entire 40 mm stack. The relative mass densities from top to bottom were 37%, 35%, 33%, and 33%.

Figure 4:
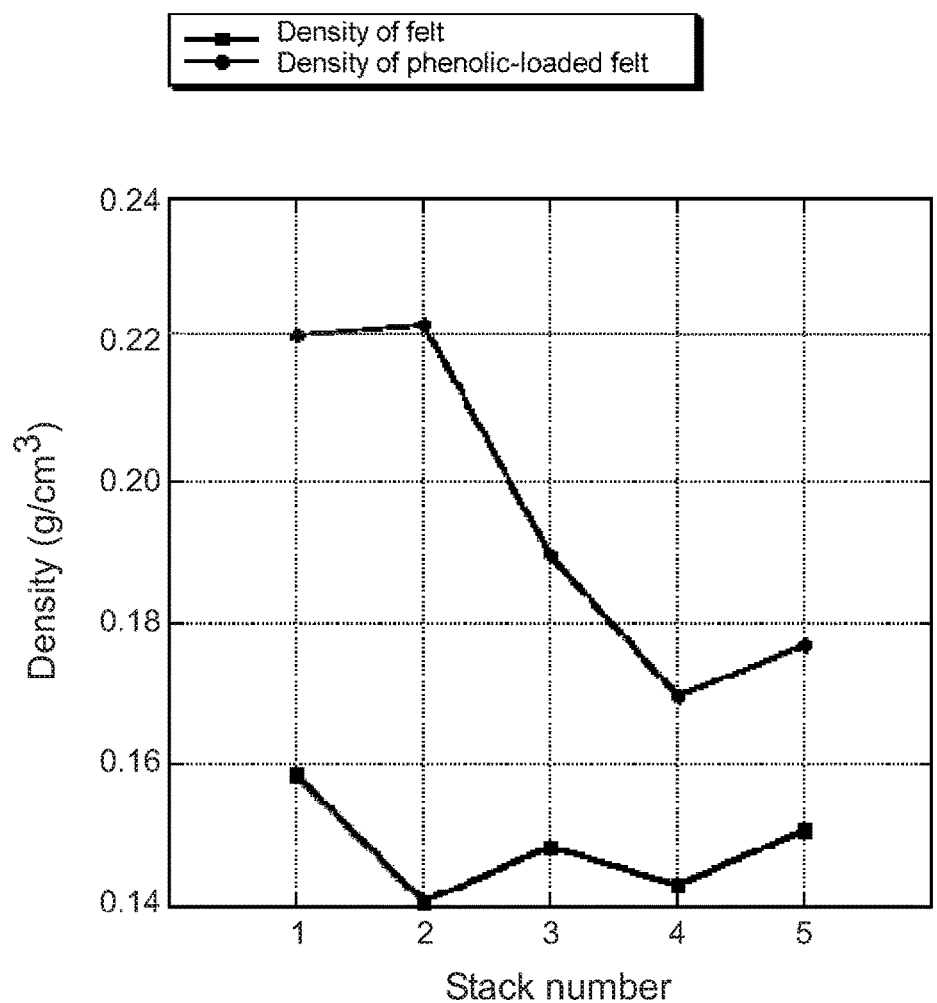
FIG. 4 shows graded density resulting from impregnation with a high-viscosity slurry.

Graded densities can conveniently be produced using viscosities of 10-100 cP. For example, a set of five ⅛" thick felts were stacked and infiltrated. The density of the felts was measured after infiltration. The results are shown in FIG. 4. In this example, most of the particles penetrated to a depth of ⅜" or less.

Example 4: Mixed Fiber Felts

A needled felt was made from a mixture of approximately equal parts carbon fibers and fibers made from a thermoset resin such as phenolic. The phenolic fibers were cured prior to incorporation into the fabric.

Figure 5:
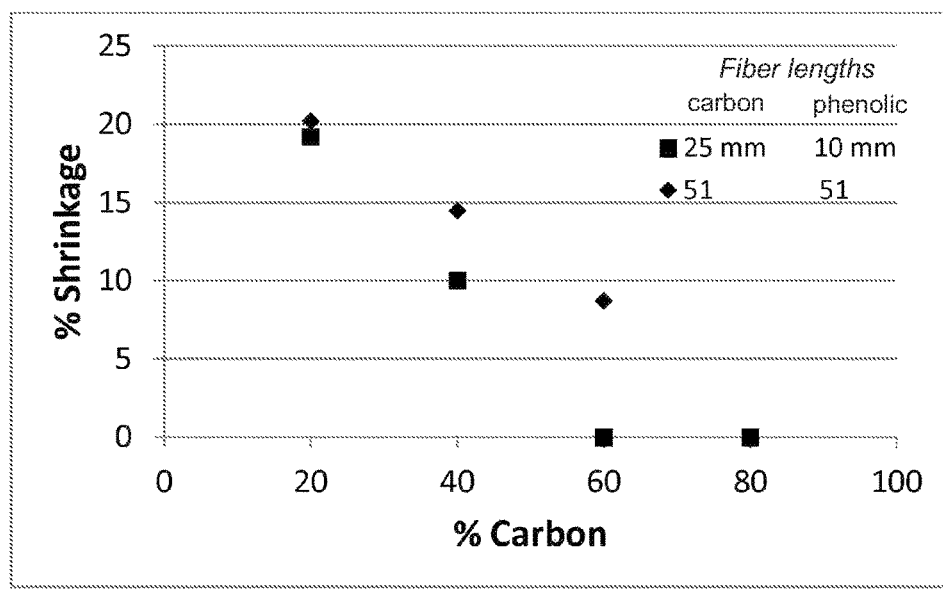
FIG. 5 shows shrinkage data for varying ratios of phenolic and carbon and for two different sets of fiber lengths.

Sample felts were made using KYNOL™ phenolic fibers from Gun-ei Chemical Industry Co., Ltd. The fibers contained approximately 76% carbon, 18% oxygen, and 6% hydrogen (by weight). Fiber was about 15-20 μm in diameter and from about 10-50 mm in length. These were mixed with carbon fibers made from RAYON precursors with diameter of about 10 μm and lengths of 25 mm, 38 mm, or 50 mm. Fibers were mixed in a carrier liquid. Mixing times of about 3-5 min gave good mixing with minimal fiber breakage. Short fibers (less than 10 mm—shortened by breakage during excessive mixing) resulted in felts with poor integrity. The best felts were made from longer fibers. These felts had a good distribution of constituents with minimum evidence of clumping. They showed less distortion and significantly less shrinkage on charring. Shrinkage data is shown in FIG. 5 for varying ratios of phenolic and carbon and for two different sets of fiber lengths: 25 mm carbon with 10 mm phenolic and 51 mm carbon with 51 mm phenolic. Too much phenolic (greater than about 50%) resulted in significant shrinkage. While the process has not yet been fully optimized, samples with 60% (by volume) carbon fibers of 25 mm length mixed with 40% KYNOL fibers of 10 mm length had zero areal shrinkage on charring and exhibited about 18% net mass loss (comparable to standard PICA of the same mass ratio).

Mechanical testing of the KYNOL/carbon felts was encouraging. Strain to failure tests showed failure at 15-20% strain (compared to 10-15% for the felt samples made by the particle impregnation method of Example 3). Similar necking behavior was observed. Thicker felts and increased needle punching (preferably from both sides) improved integrity and reduced data scatter.

Room temperature thermal conductivity was comparable to felt samples made by the particle impregnation method of Example 3.

Example 5: Stress-Strain Measurements

Figure 6:
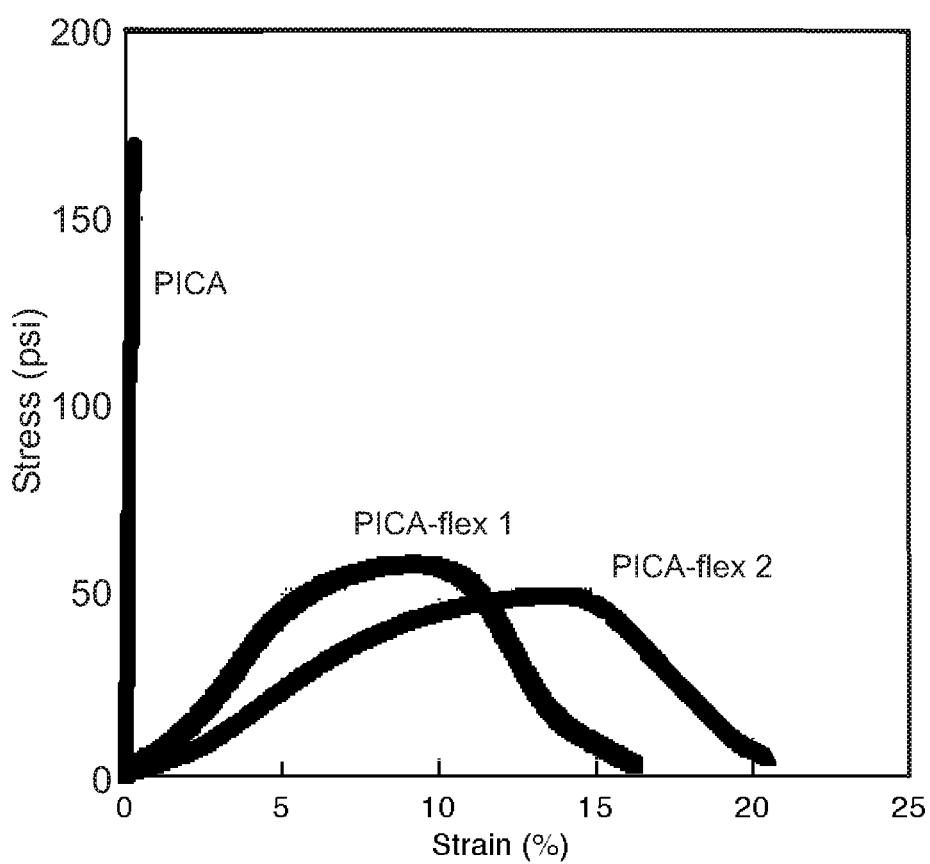
FIG. 6 shows stress-strain curves for two samples of flexible PICA.
Figure 7:
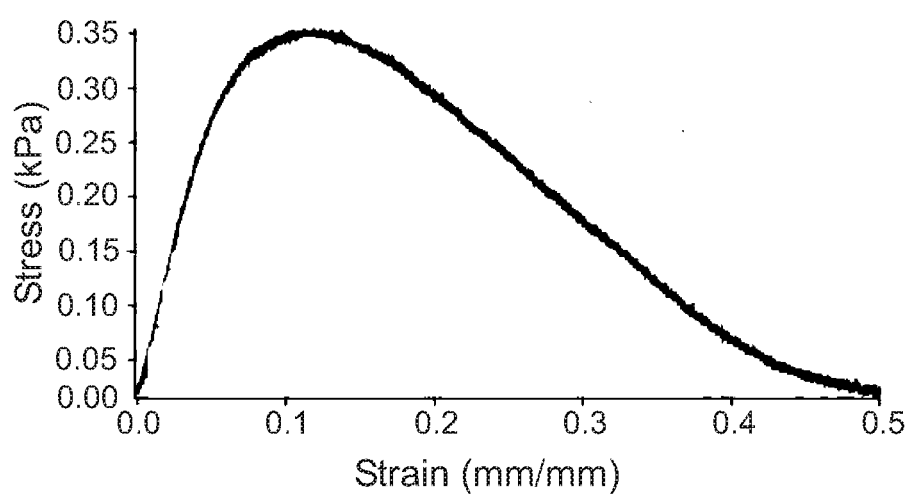
FIG. 7 shows stress-strain curves for flexible PICA char.

Mechanical tests were performed on 8"×1"×0.8" samples. Samples were bonded to aluminum pull blocks using epoxy and tested in tension mode at a strain rate of 0.05 inch/minute while the strain was measured to generate stress-strain curves and evaluate ultimate tensile strength and strain to failure. Example stress-strain curves are shown in FIG. 6 for two samples of flexible PICA and in FIG. 7 for flexible PICA char. Flexible PICA failed gracefully, showing necking behavior traditionally associated with very ductile materials, exhibiting 8-14% strain before onset of necking, and failing at 10-20% strain, as shown in FIG. 6. Flexible PICA char also exhibited about 10% strain before onset of necking (FIG. 7). In contrast, standard PICA failed below 0.5% strain, and standard PICA char failed at about 0.25% strain.

The Ultimate Tensile Strength (UTS) depended primarily on the density of the felt substrate. The low-density Morgan felt showed a UTS of about 35 psi, the low and mid density FMI felts showed a UTS of about 50 psi, and the high-density FMI felt showed a UTS of about 100 psi. The UTS can therefore be selected by selecting the appropriate felt density. Strain to failure of all samples exceeded 10% which is sufficient for a wide range of applications.

Example 6: Thermal Conductivity Measurements

Room temperature thermal conductivity was measured by a laser flash method using an LFA 427 Laser Flash Analyzer made by Netzsch. Samples of both standard PICA and flexible PICA samples made by Method 1 having comparable densities were measured. The flexible PICA samples showed substantially lower room temperature thermal conductivity compared to standard PICA, exhibiting only approximately one third the thermal conductivity of the standard PICA samples. This lower thermal conductivity is likely a result of both the looser structure of the carbon preform (not connected into a rigid three-dimensional as is the FIBERFORM material) and the particulate nature of the polymer.

Thermal conductivity measurements as a function of temperature were also measured on charred samples of flexible PICA. For reference, standard PICA char has a room temperature thermal conductivity of 0.22 W/mK. Flexible PICA has a room temperature thermal conductivity of only 0.06 W/mK increasing to 0.12 W/mK at 1100 C. Thus, flexible PICA has less than one third of the thermal conductivity of standard PICA at room temperature and retains that thermal conductivity advantage at high temperature.

Example 7: Laser Exposure Tests

Table 2 shows the results of two standardized exposures using a 10.6 μm CO2 laser at the Laser Hardened Material Evaluation Laboratory (LHMEL) for flexible PICA samples and standard PICA samples of comparable areal mass. Each sample was exposed on the front face to the indicated heat load for the indicated time, and the temperature on the back face was measured. Table 2 shows the maximum back face temperature reached and the time to reach that temperature at the two exposures tested.

TABLE 2

|  | 450 W/cm$^2$, 25 sec | | 115 W/cm$^2$, 50 sec | |
| --- | --- | --- | --- | --- |
| Material | Max temp | Time to reach | Max temp | Time to reach |
| standard PICA | 240 C. | 93 s | 276 C. | 108 s |
| PICA-flex 1 | 118 | 213 | 128 | 223 |
| PICA-flex 2 | 76 | 246 | 84 | 232 |
| PICA-flex 3 | 133 | 143 | 173 | 144 |

The maximum back face temperatures for the flexible PICA samples were dramatically lower, and the times required to reach the maximum temperature were much longer.

Example 8: Arc Jet Tests

One inch diameter samples were tested in an Arc Jet facility (HYMETs) to simulate atmospheric entry conditions. Each sample had a tile collar to help alleviate side wall heating. Samples were tested at 400 W/cm$^2$ for 20 s and at 120 W/cm$^2$ for 40 s. Four versions of flexible PICA were tested and compared with a sample of standard PICA. The maximum backface temperature was recorded and is shown in Table 3.

TABLE 3

| Specimen | 120 W/cm$^2$, 40 s | 120 W/cm$^2$, 40 s | 400 W/cm$^2$, 20 s |
| --- | --- | --- | --- |
| PICA-flex 1 | 267 C. | 276 C. | 265 C. |
| PICA-flex 2 | 240 | 236 | 255 |
| PICA-flex 3 | 228 | 237 | 267 |
| PICA-flex 4 | 256 | 272 | 263 |
| standard PICA | 361 | 382 | 324 |

As can be seen in the table, the Arc Jet tests confirm predictions that can be made from the thermal conductivity measurements cited above. Flexible PICA is a significantly better insulator, and the maximum backface temperature is much lower for flexible PICA than for standard PICA under both test conditions.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method of fabricating a low-density thermal protection material, the method comprising:
providing a flexible substrate;
providing a slurry including a carrier liquid and pyrolizable thermoset resin particles that have already been cured and that are immersed in, but not soluble in, the carrier liquid;
impregnating the slurry into the substrate to form an impregnated substrate; and
removing the carrier liquid from the impregnated substrate to provide said low-density thermal protection material that remains flexible after the thermoset resin particles are fully pyrolized.

2. The method of claim 1, wherein said thermoset resin particles constitute between 20% and 80% of the mass of the thermal protection material.

3. The method of claim 1, wherein said thermoset resin particles constitute between 40% and 60% of the mass of the thermal protection material.

4. The method of claim 1, wherein said thermal protection material has a mass density between 0.15 and 0.35 g/cm$^3$.

5. The method of claim 1, wherein providing a slurry including a carrier liquid and pyrolizable thermoset resin particles further includes providing said thermoset resin particles with a pyrolysis temperature above 350 C.

6. The method of claim 1, wherein providing a flexible structure further includes providing a flexible substrate that is a felt.

7. The method of claim 1, wherein providing a flexible structure further includes providing a flexible substrate that includes carbon fibers.

8. The method of claim 1, wherein providing a slurry including a carrier liquid and pyrolizable, thermoset resin particles further includes providing thermoset resin particles including at least one of phenolic, polyimide, polybenzobisoxazole, polybenzimidazole, polyaramid or a mixture thereof.

9. The method of claim 1, wherein providing a slurry including a carrier liquid and pyrolizable, thermoset resin particles includes preparing said thermoset resin particles by breaking cured resin into small fragments and milling the fragments for less than two hours.

10. The method of claim 9, further including milling said fragments for a duration required to produce particles having a median diameter of 2-6 μm.

11. The method of claim 1, wherein impregnating the slurry into the substrate further includes impregnating the slurry into the substrate using a pressure gradient.

12. The method of claim 11, wherein providing a slurry including a carrier liquid and pyrolizable, thermoset resin particles further includes providing a slurry wherein the viscosity of said slurry is low enough that the final distribution of particles is uniform through the thickness of said impregnated substrate.

13. The method of claim 12, further including providing a slurry wherein the viscosity of said slurry is less than 6 cP.

14. The method of claim 11, further including providing a slurry wherein the viscosity of said slurry is high enough that the final distribution of particles is graded through the thickness of said impregnated substrate.

15. The method of claim 1, further including providing said thermal protection material as a continuous sheet of flexible material.

16. The method of claim 15, further including mounting said continuous sheet on an atmospheric entry vehicle.

17. The method of claim 16, further including stowing said continuous sheet prior to atmospheric entry and deploying said thermal protection material shortly before atmospheric entry.

* * * * *